United States Patent [19]

Markis

[11] Patent Number: 5,157,522
[45] Date of Patent: Oct. 20, 1992

[54] METHOD AND APPARATUS FOR PROVIDING CORRECTION OF HOLOGON TRANSMISSION EFFICIENCY VARIATIONS

[75] Inventor: William R. Markis, Rochester, N.Y.

[73] Assignee: Eastman Kodak Company, Rochester, N.Y.

[21] Appl. No.: 678,093

[22] Filed: Apr. 1, 1991

[51] Int. Cl.$^5$ ............................................. G02B 15/32
[52] U.S. Cl. ........................................ 359/18; 359/17
[58] Field of Search ..................................... 359/17, 18

[56] References Cited

U.S. PATENT DOCUMENTS

| | | |
|---|---|---|
| 4,415,224 | 11/1983 | Dickson . |
| 4,548,463 | 10/1985 | Cato et al. . |
| 4,699,446 | 10/1987 | Banton et al. . |
| 4,751,523 | 6/1988 | Froelich . |

FOREIGN PATENT DOCUMENTS

| | | |
|---|---|---|
| 57-196213 | 12/1982 | Japan . |
| 59-33423 | 2/1984 | Japan . |

Primary Examiner—Bruce Y. Arnold
Assistant Examiner—J. D. Ryan
Attorney, Agent, or Firm—Mark Z. Dudley

[57] ABSTRACT

A calibration method and apparatus is disclosed that includes a power stabilized laser diode to generate a laser beam that is passed through the hologon scanner to be calibrated and a mechanism for measuring the power intensity of the laser beam at a plurality of positions at an exposure plane for each facet of the hologon scanner. The measured light levels are converted to correction factors that are stored in a corresponding programmable read only memory (PROM) as a function of facet number and scan position. The hologon scanner and its corresponding programmable PROM are then installed in a laser scanning apparatus. The laser scanning apparatus adjusts the output of its light source in accordance with the correction factors stored in the PROM in order to compensate for variations in the light transmission efficiency of the facets of the hologon scanner.

13 Claims, 6 Drawing Sheets

METHOD AND APPARATUS FOR PROVIDING CORRECTION OF HOLOGON TRANSMISSION EFFICIENCY VARIATIONS

FIELD OF THE INVENTION

The invention relates generally to methods and devices that provide correction for fluctuations in the power intensity of a scanning laser beam caused by hologon transmission efficiency variations. In particular, the invention provides a method and apparatus for detecting and correcting facet-to-facet and intrafacet or in-line variations in the light transmission efficiency of a hologon scanner used to generate the scanning laser beam.

BACKGROUND OF THE INVENTION

Laser printing devices that employ a hologon film scanner to generate a scanning laser beam are well known in the art. The hologon film scanner typically includes a hologon disc containing a number of facets. A laser beam is directed to the hologon disc as the disc is rotated by a drive motor. The laser beam is deflected as it passes through the facets of the rotating hologon disc and the deflected beam is used to scan a line on a photoreceptor, such as a photosensitive drum or belt utilized in some electrostatic printing devices or a photographic film in a film scanner printing device. The power intensity of the laser beam can be modulated to create either a continuous tone image or a number of discrete image pixels.

There is a problem, however, associated with the above-described laser printing devices, namely, print quality can be seriously degraded due to line-to-line and intraline fluctuations in the power intensity of the scanned laser beam. The power intensity fluctuations are caused by facet-to-facet and intrafacet variations in the light transmission efficiency of the hologon disc. The fluctuations in light transmission efficiency, and the problems associated therewith, can be minimized if the hologon disc is manufactured to exacting tolerances. The manufacturing precision required to eliminate the above-described power intensity fluctuations, however, is very expensive and greatly increases the overall cost of a hologon scanner.

In view of the above, it is an object of the invention to provide a method and apparatus for detecting and correcting facet-to-facet and intrafacet variations in the light transmission efficiency of a hologon scanner, thereby improving printing quality while simultaneously lowering the manufacturing expense of the hologon scanner. Other objects and advantages of the invention will become apparent after further study of the detailed description of the preferred embodiments of the invention provided below.

SUMMARY OF THE INVENTION

The invention provides a method and apparatus for detecting and correcting facet-to-facet and intrafacet variations in the light transmission efficiency of a hologon scanner. More specifically, a calibration method and apparatus is disclosed which utilizes a power stabilized laser diode to generate a laser beam that is passed through the hologon scanner to be calibrated, and a mechanism for measuring the power intensity of the laser beam at a plurality of positions at an exposure plane for each facet of the hologon scanner undergoing the calibration process. The measured light levels are converted to correction factors that are stored in a corresponding programmable memory device, for example a programmable read only memory (PROM), as a function of facet number and scan positions. The hologon scanner and its corresponding programmable memory device are then installed in a laser scanning apparatus. The laser scanning apparatus adjusts the output of its light source in accordance with the correction factors stored in the programmable memory device in order to compensate for variations in the light transmission efficiency of the facets of the hologon scanner.

BRIEF DESCRIPTION OF THE DRAWINGS

With the above as background, reference should now be made to the following detailed description of the preferred embodiment of the invention and the accompanying drawings in which.

DETAILED DESCRIPTION OF THE PREFERRED EMBODIMENT

As described above, the invention is directed to a method and apparatus for detecting and correcting facet-to-facet and intrafacet variations in the light transmission efficiency of a hologon scanner, thereby enabling less expensive manufacturing techniques to be employed in the production of the hologon scanner. The invention is based on the recognition that the transmission characteristics of each individual hologon scanner can be determined prior to the installation of the hologon scanner in a laser scanner apparatus. Once the transmission characteristics are known, correction factors can be generated to compensate for facet-to-facet and intrafacet variations in the light transmission efficiency of the hologon scanner. The correction factors can be stored in corresponding programmable read only memory (PROM) devices as a function of facet number and scan position. Once a hologon scanner and its corresponding programmable PROM are installed in a laser scanning apparatus, the laser scanning apparatus adjusts the output of its light source in accordance with the correction factors stored in the PROM in order to compensate for variations in the light transmission efficiency of the facets of the hologon scanner.

Figure 1:
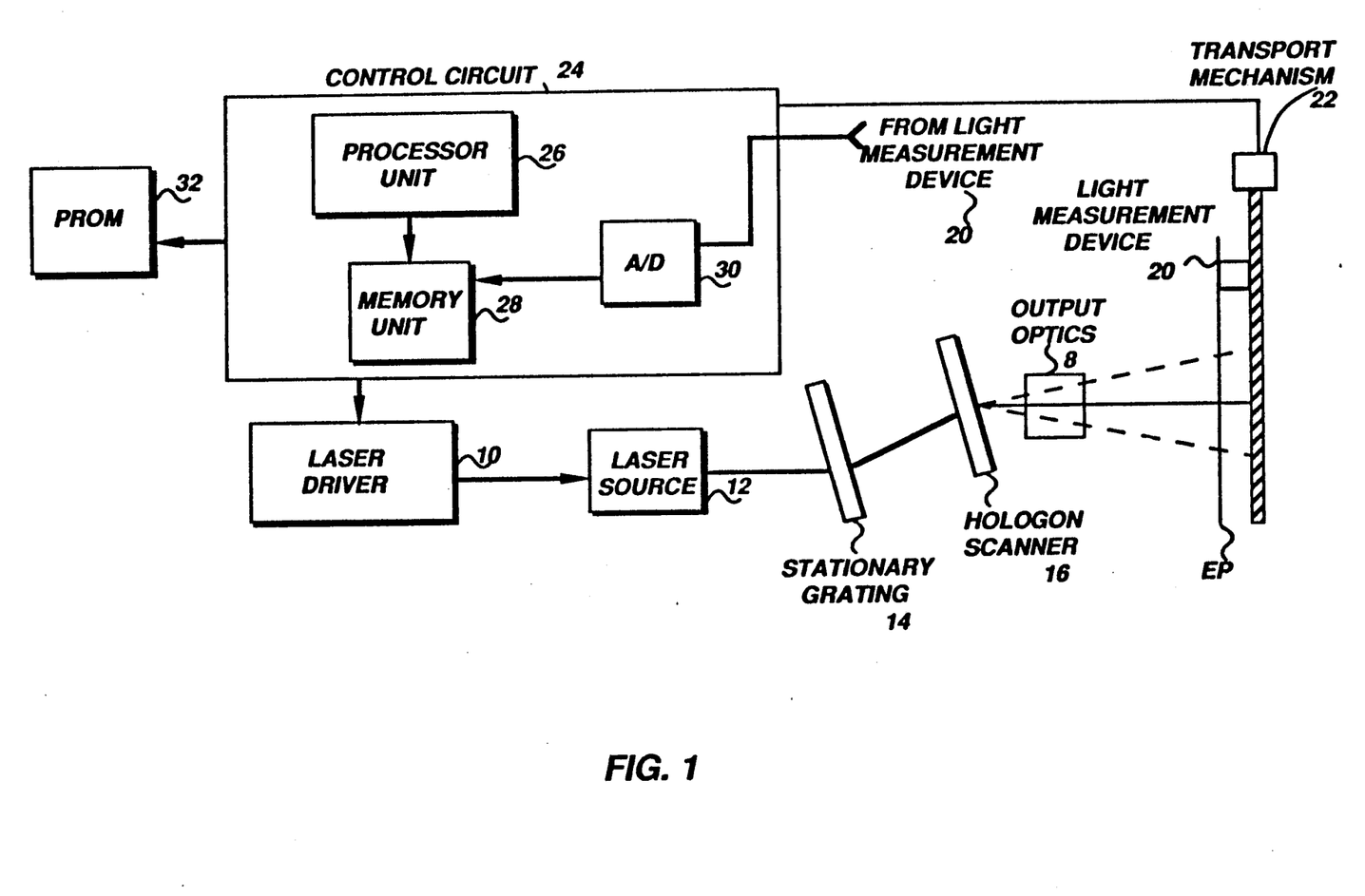
FIG. 1 is a basic schematic diagram illustrating a hologon scanner calibration assembly in accordance with the present invention.

Referring now to FIG. 1, a basic schematic diagram illustrating a hologon scanner calibration assembly in accordance with the present invention is shown including a laser driver 10 that controls the operation of a laser source 12. The output beam from the laser source 12 is passed through a stationary grating 14, a hologon scanner 16 to be calibrated, and is focused on an exposure plane EP via output optics 18. A light measurement device 20, for example a Photodyne Model 44XLA Optical Power Meter with Model 600 photodetector and integrating sphere, is mounted on a transport mechanism 22 that preferably includes a lead screw coupled to a stepper motor drive unit. The output signal from the light measurement device 20 is supplied to a control circuit 24. The control circuit 24 includes a processor unit 26 coupled to a memory unit 28, that contains an operating program for the processor unit 26, and an A/D converter 30.

The control circuit 24 coordinates the operation of the hologon scanner 16, the transport mechanism 22, and the operation of the light measurement device 20, in order to obtain a samples of the scanned light beam at a number of points (x) of the exposure plane EP for each of the facets of the hologon scanner 16 to be calibrated. More specifically, the control circuit 24 sends a control signal to the transport mechanism 22 that causes the transport mechanism 22 to move the light measurement device 20 along the exposure plane EP in unison with the scanned light beam. The light measurement device 20 is activated at preselected positions or sample points to sample the intensity of the scanned light beam. The light samples are indicative of the in-line or intrafacet light transmission efficiency of each facet of the hologon scanner 16. Analog signals sampling signals generated by the light measurement device 20 are converted into digital data by the A/D converter 30 which are stored in the memory unit 28 under control of the processor unit 26. The processor unit 26 then performs a calibration correction routine on the stored digital data, in accordance with a calibration correction program previously stored in the memory unit 28, to generate a plurality of correction factors that correspond to the sampled scanning point for each facet of the hologon scanner 16. The correction factors generated by the processor unit are stored in a PROM 32 that is coupled to the control circuit 24.

Figure 2:
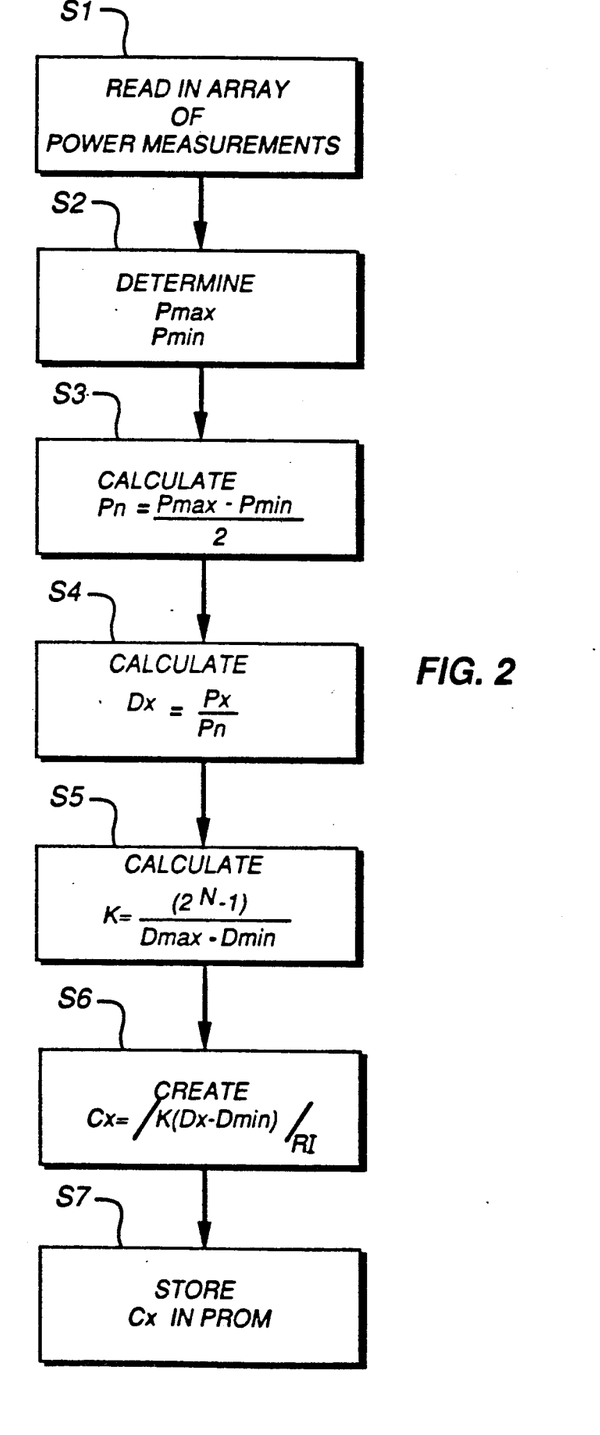
FIG. 2 is a basic flow diagram of a calibration correction routine used by the hologon scanner calibration assembly of FIG. 1 to generate correction factors in accordance with a first embodiment of the invention.

FIG. 2 is a general flow diagram of the calibration correction routine performed by the processor unit 26 in accordance with a first embodiment of the invention. At step S1, the processor unit 26 reads in an array of light power measurements corresponding to sample points (x) which are supplied by the light measurement device 20. The processor unit 26 then determines the maximum power transmission point Pmax and the minimum power transmission point Pmin from the stored array in step S2. At step S3, the processor unit 26 determines a null power level point Pn based on the maximum transmission point Pmax and the minimum transmission point Pmin. The null power level point is the power level which requires no correction and all sample points are corrected to this value. At step S4, a correction divisor Dx is calculated for each sample point by dividing the power measured at the sample point Px by the null power Pn. This yields an array of correction divisors Dx which, when divided into the power measured at a sample point Px, will yield the null power Pn. In order to map the correction divisors into the PROM 32, the processor unit 26 calculates a mapping factor K in step S5 by dividing the number of available storage locations by the difference between the largest correction divisor Dmax and the smallest correction divisor Dmin. A linear array of integer correction divisors Cx is then created in step S6 by taking the absolute value, rounded to the nearest integer (RI), of the mapping factor multiplied by the difference between the a given correction divisor Dx and the smallest correction divisor Dmin. The array of integer correction divisors Cx is then stored in PROM 32 at step S7.

The hologon 16 and the PROM 32 corresponding thereto are removed from the hologon scanner calibration assembly after completion of the calibration correction routine. The PROM 32 is stored or packaged with the hologon scanner 16 until they are both installed in the same laser scanning apparatus. The laser scanning apparatus utilizes the correction factors stored in the PROM 32 to control the output of its light source in order to compensate for the facet-to-facet and intrafacet variations in the light transmission efficiency of the hologon scanner 16.

Figure 3:
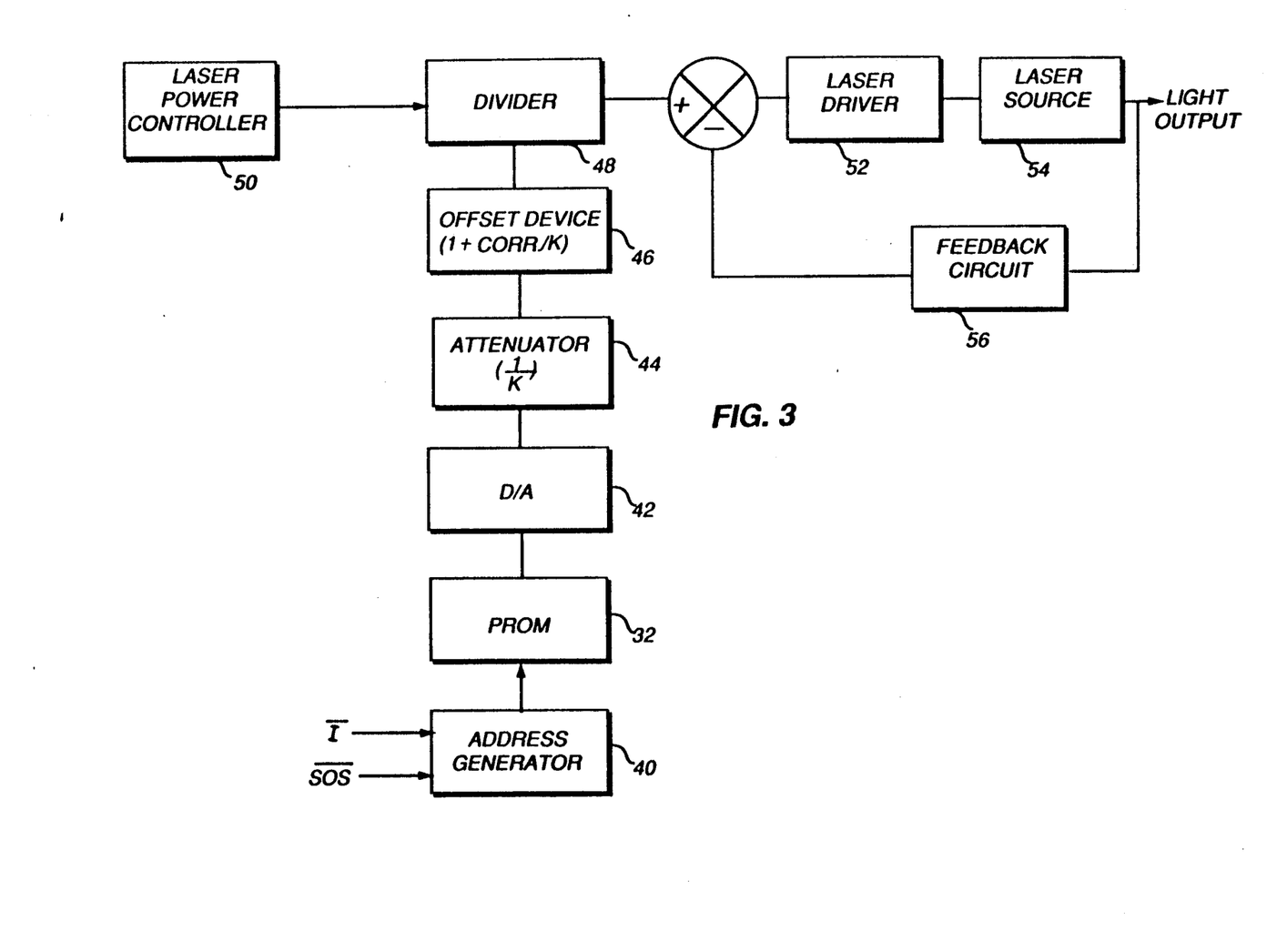
FIG. 3 illustrates a laser scanner apparatus that utilizes a PROM containing the correction factors generated by the hologon scanner calibration assembly illustrated in FIG. 1 to correct the light output of its light source in accordance with a first embodiment of the invention.

An example of a laser scanning apparatus in accordance with the invention is illustrated in FIG. 3. The laser scanning apparatus includes an address generator 40 that generates memory addresses which are supplied to the PROM 32 in order to retrieve the stored correction factors. The digitally stored correction factors are output from the PROM 32 in response to the memory addresses generated by the address generator 40 and supplied to a digital-to-analog (D/A) converter 42. The D/A converter 42 converts the digital correction factors into analog output signals that are supplied to an attenuator 44, which in turn adjusts the amplitude levels of the analog output signals to appropriately match desired analog correction factor signal levels. For example, in the illustrated embodiment, the attenuator 44 effectively divides the amplitude level of the analog output signals by the factor K which was used in the generation of the array Cx. The attenuated signal from the attenuator 44 is added to a predetermined offset voltage by an offset device 46 which effectively adjusts the null value of the system. The resulting analog correction factor signal is supplied to a divider 48 which is also coupled to a laser power controller 50. The divider 48 divides a laser power signal, which is generated by the power controller 50, by the analog correction factor signal to generate a corrected laser power signal. The corrected laser power signal is supplied to a laser driver 52 that controls the operation of a laser source 54 in response to the corrected laser power signal. A feedback circuit 56 is also provided to regulate the output of the laser source 54.

Figure 4:
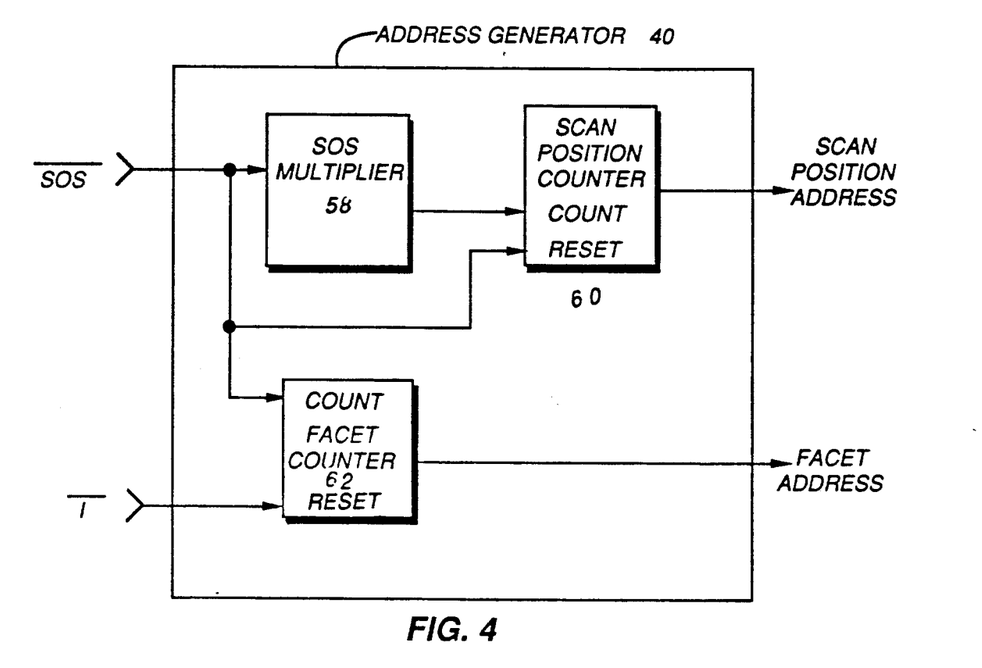
FIG. 4 is a block diagram of an address generator employed in the laser scanner apparatus illustrated in FIG. 3.
Figure 5:
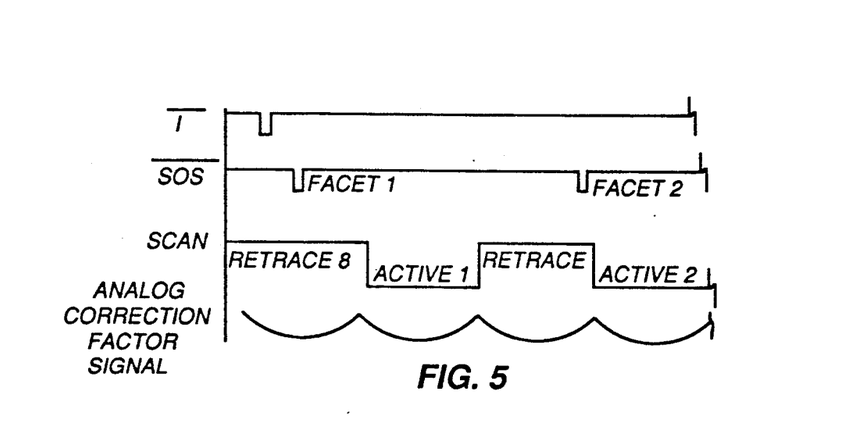
FIG. 5 is a representative timing diagram of the signals employed by the address generator illustrated in FIG. 4.

As shown in greater detail in FIG. 4, the address generator 40 is responsive to a start-of-scan (SOS) signal generated by photodiode sensor placed at the start position of an active scan line within the laser scanning apparatus and an index signal (I) that is generated by the hologon scanner 16 when it reaches an initial starting position. The index signal (I) is generated, for example, by an optical sensor that reads an index mark placed on the hologon scanning disc of the hologon scanner 16. The SOS signal is supplied to an SOS multiplier 58 that generates and supplies a clocking signal to a scan position counter 60. The scan position counter 60 supplies a scan position address to the PROM 36 which designates a specific point (x) in a scan line. The SOS signal is also supplied to the reset input of the scan position counter 60, so that the scan position counter 60 is reset at the beginning of each scan, and to the clock input of a facet counter 62. The facet counter 62 is therefore clocked at the beginning of each scan line and generates a facet address indicative of which facet of the hologon scanner is being employed. The facet address, as with the scan position address, is supplied to the PROM 36. The facet counter 62 is reset when the index signal (I) is generated. As previously stated, the PROM 36 is loaded with an array of correction factors that are addressed by facet number and scan position. Thus, the correction factor for a given facet and scan position is supplied to the D/A converter 42 from the PROM 36 when the address generator 40 supplies the corresponding facet and scan position addresses. A representative timing diagram illustrating signal generation during a scanning operation is shown in FIG. 5.

Figure 6:
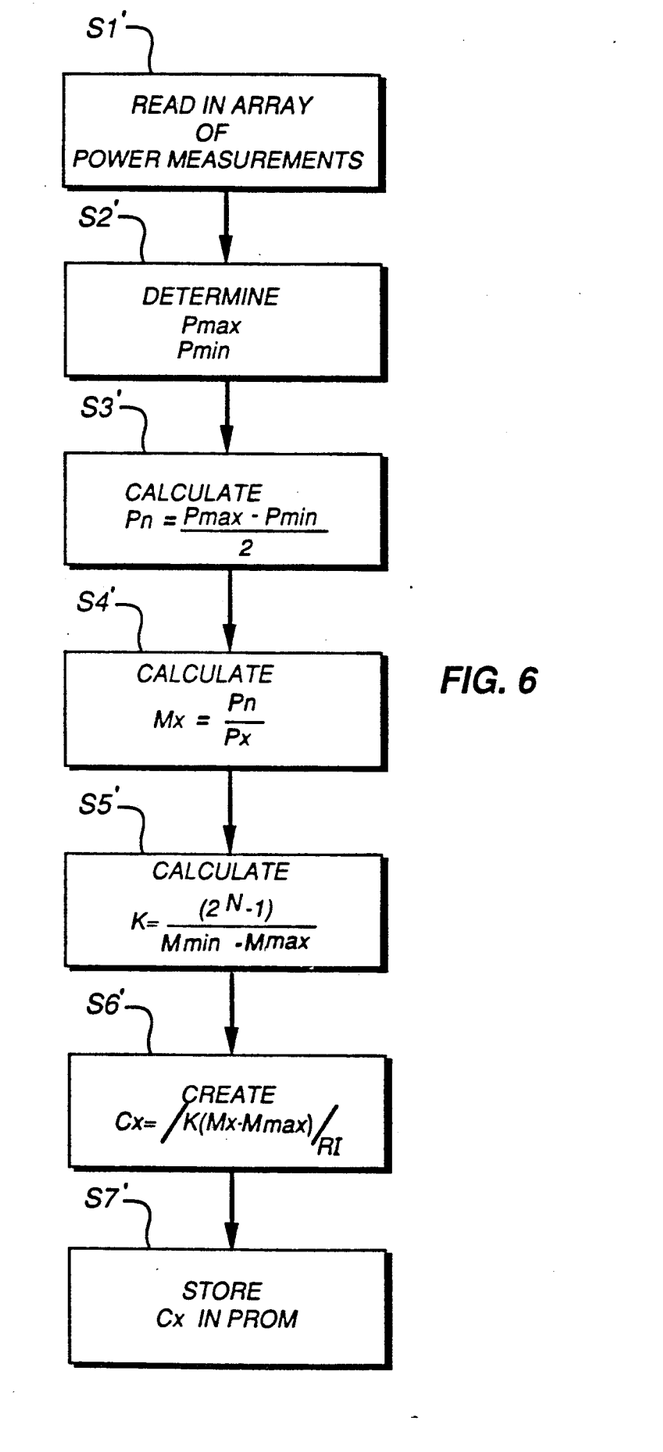
FIG. 6 is a basic flow diagram of a calibration correction routine used by the hologon scanner calibration assembly of FIG. 1 to generate correction factors in accordance with a second embodiment of the invention.
Figure 7:
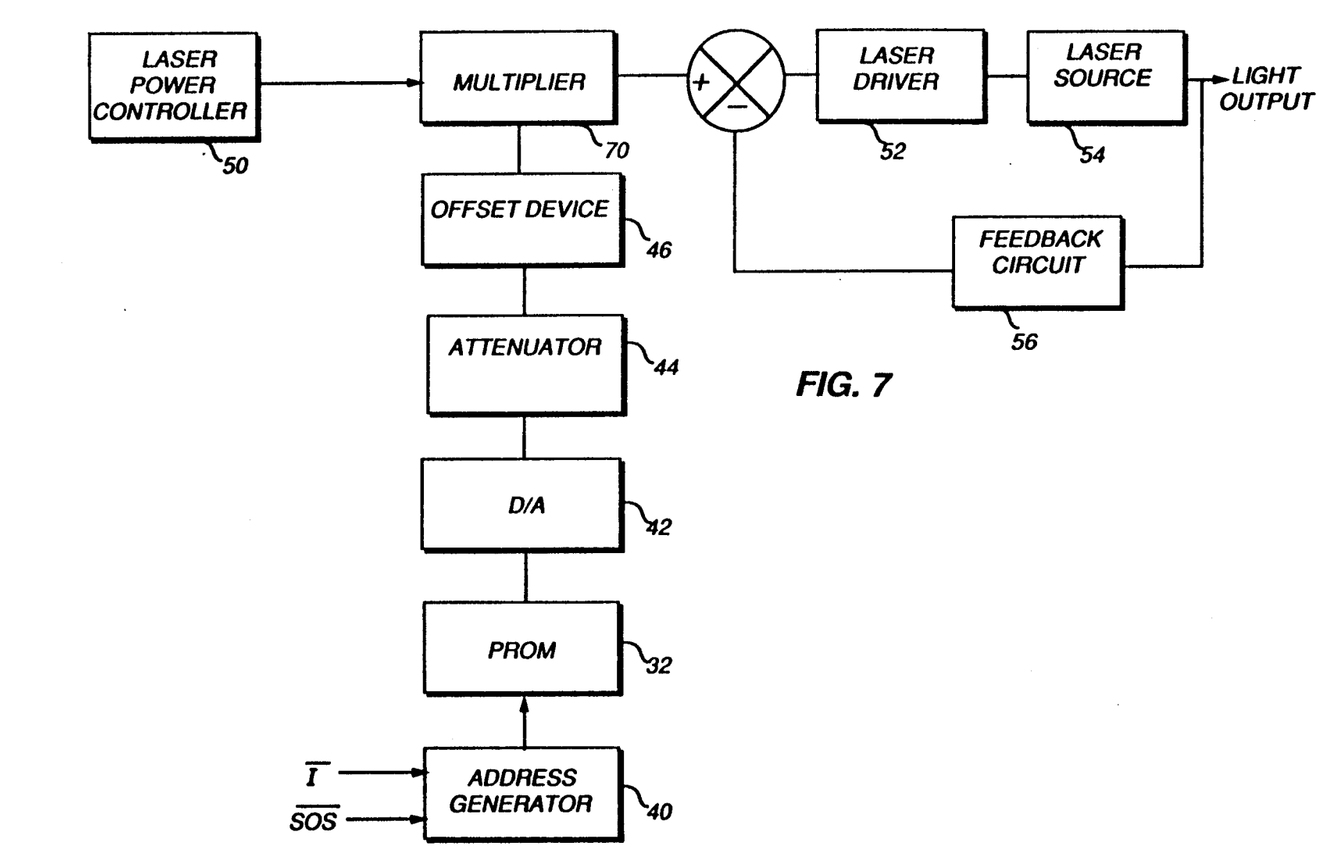
FIG. 7 illustrates a laser scanner apparatus in accordance with a second embodiment of the invention that utilizes a multiplier instead of the divider utilized in the first embodiment illustrated in FIG. 3.

The embodiment described above yields a linear array of divisors which map well into the linear array of PROM space that is available. At high scanning speeds, however, it may be easier and less expensive to utilize multiplication factors as fast multiplier devices are readily available. Thus, the operation of the hologon scanner calibration assembly illustrated in FIG. 1 can be modified to produce correction multipliers Mx instead of correction divisors Dx as shown in FIG. 6. The structure of a laser scanning apparatus employing correction multipliers remains the same, except the divider 48 is replaced by a multiplier 70 which multiplies the laser power signal by the analog correction factor signal supplied by the offset device 44 as shown in FIG. 7. It should be noted that the use of correction multipliers yields a nonlinear array which is difficult to map into the PROM 32. The results can be skewed, however, to yield the best mapping fit.

The invention has been described with reference to certain preferred embodiments thereof. It will be understood, however, that variations and modifications are possible within the spirit and scope of the appended claims. For example, a multiplying D/A converter can be employed to perform the functions of the D/A converter 42 and the attenuator 44. A number of discrete detection devices can also be used to measure the light levels at the exposure plane instead of a single device that is moved along the exposure plane with the scanning beam as illustrated in FIG. 1.

What is claimed is:

1. A method of storing correction factors for hologon scanner transmission efficiency variations, said method comprising the steps of:
    generating a source laser beam with a hologon scanner calibration assembly;
    applying the source laser beam to a hologon scanner to be calibrated to generate a scanning laser beam;
    directing the scanning laser beam to an exposure plane;
    measuring the intensity of the scanning laser beam at a plurality of points at the exposure plane;
    generating correction factors with a processor of the hologon scanner calibration assembly based on the measured intensity of the scanning laser beam at the plurality of points;
    transferring and storing the correction factors from the processor of the hologon scanner calibration assembly to a programmable memory device that corresponds to the hologon scanner; and
    removing the hologon scanner and the corresponding programmable memory device from the hologon scanner calibration assembly.

2. A method of storing correction factors for hologon scanner transmission efficiency variations, said method comprising the steps of: generating a source laser beam; applying the source laser beam to a hologon scanner to generate a scanning laser beam; directing the scanner laser beam to an exposure plane; measuring the intensity of the scanning laser beam at a plurality of points at the exposure plane; generating correction factors based on the measured intensity of the scanning laser beam at the plurality of points; and storing the correction factors in a programmable memory device that corresponds to the hologon scanner; wherein the step of generating correction factors includes generating a plurality of correction divisors.

3. A method of storing correction factors for hologon scanner transmission efficiency variations, said method comprising the steps of: generating a source laser beam; applying the source laser beam to a hologon scanner to generate a scanning laser beam; directing the scanning laser beam to an exposure plane; measuring the intensity of the scanning laser beam at a plurality of points at the exposure plane; generating correction factors based on the measured intensity of the scanning laser beam at the plurality of points; and storing the correction factors in a programmable memory device that corresponds to the hologon scanner; wherein the step of generating correction factors includes generating a plurality of correction multipliers.

4. A method of correcting for hologon scanner transmission efficiency variations in a scanner apparatus comprising the steps of:
    installing a hologon scanner and a corresponding programmable memory device containing correction factors for the hologon scanner in a scanning apparatus;
    retrieving at least one digital correction factor from the programmable memory device and generating a corresponding correction factor signal with a processor of the scanning apparatus;
    generating a laser power control signal;
    combining the laser power control signal with the correction factor signal to produce a correction laser power control signal; and
    applying the corrected laser power control signal to a laser source of the scanning apparatus.

5. A method of correcting for hologon scanner transmission efficiency variations in a scanning apparatus comprising the steps of: retrieving at least one digital correction factor from a memory device and generating a corresponding correction factor signal; generating a laser power control signal; combining the laser power control signal with the correction factor signal to produce a corrected laser power control signal; and applying the corrected laser power control signal to a laser source; wherein the step of combining the laser power control signal with the correction factor signal includes dividing the laser power control signal by the correction factor signal.

6. A method of correcting for hologon scanner transmission efficiency variations in a scanning apparatus comprising the steps of: retrieving at least one digital correction factor from a memory device and generating a corresponding correction factor signal; generating a laser power control signal; combining the laser power control signal with the correction factor signal to produce a corrected laser power control signal; and applying the corrected laser power control signal to a laser source; wherein the step of combining the laser power control signal with the correction factor signal includes multiplying the laser power control signal by the correction factor signal.

7. A hologon scanner calibration apparatus for detecting hologon scanner transmission efficiency variations comprising: means for generating a source laser beam; means for applying the source laser beam to a hologon scanner to be calibrated to generate a scanning laser beam; means for directing the scanning laser beam to an exposure plane; means for measuring the intensity of the scanning laser beam at a plurality of points at the exposure plane; means for generating correction factors based on the measured intensity of the scanning laser beam at the plurality of points; and means for storing the correction factors in a programmable read only memory device that corresponds to the hologon scanner.

8. An apparatus for correcting hologon scanner transmission efficiency variations comprising: means for generating a source laser beam; means for applying the source laser beam to a hologon scanner to generate a scanning laser beam; a means for directing the scanning laser beam to an exposure plane; means for measuring the intensity of the scanning laser beam at a plurality of points at the exposure plane; means for generating correction factors based on the measured intensity of the scanning laser beam at the plurality of points; and means for storing the correction factors in a programmable memory device that corresponds to the hologon scanner; wherein the means for generating correction factors generates a plurality of correction divisors.

9. An apparatus for correcting hologon scanner transmission efficiency variations comprising: means for generating a source laser beam; means for applying the source laser beam to a hologon scanner to generate a scanning laser beam; means for directing the scanning laser beam to an exposure plane; means for measuring the intensity of the scanning laser beam at a plurality of points at the exposure plane; means for generating correction factors based on the measured intensity of the scanning laser beam at the plurality of points; and means for storing the correction factors in a programmable memory device that corresponds to the hologon scanner; wherein the means for generating correction factors generates plurality of correction multipliers.

10. A scanning apparatus comprising: means for retrieving at least one digital correction factor from a programmable read only memory device and generating a corresponding correction factor signal; means for generating a laser power control signal; means for combining the laser power control signal with the correction factor signal to produce a corrected laser power control signal; and means for applying the corrected laser power control signal to a laser source to generate a source laser beam; wherein the programmable read only memory contains correction factors for a corresponding hologon scanner that is installed in the scanning apparatus and the laser source beam is applied to a hologon scanner to generate a scanning laser beam.

11. An apparatus for correcting hologon scanner transmission efficiency variations comprising: means for retrieving at least one digital correction factor from a memory device and generating a corresponding correction factor signal; means for generating a laser power control signal; means for combining the laser power control signal with the correction factor signal to produce a corrected laser power control signal; and means for applying the corrected laser power control signal to a laser source; wherein the means for combining the laser power control signal with the correction factor signal includes a divider.

12. An apparatus for correcting hologon scanner transmission efficiency variations comprising: means for retrieving at least one digital correction factor from a memory device and generating a corresponding correction factor signal; means for generating a laser power control signal; means for combining the laser power control signal with the correction factor signal to produce a corrected laser power control signal; and means for applying the corrected laser power control signal to a laser source; wherein the means for combining the laser power control signal with the correction factor signal includes a multiplier.

13. An apparatus comprising:
a laser driver coupled to a laser source, the laser source generating a laser beam in response to a control signal supplied by the laser driver; optical means for passing the laser beam through a hologon scanner to be calibrated to generate a scanning laser beam; an optical unit for focusing the scanning laser beam at an exposure plane; a light measurement device coupled to a transport mechanism; and a control circuit;
wherein the control circuit controls the operation of the transport mechanism to move the light measurement device along the exposure plane in unison with the scanning laser beam and the light measurement device samples the scanning laser beam at a plurality of points along the exposure plane to generate light sample signals that are supplied to the control circuit; and
wherein the control circuit generates a plurality of correction factors in response to the light sample signals supplied by the light measurement device and stores the correction factors in a programmable memory device.

* * * * *